United States Patent [19]

Erickson et al.

[11] Patent Number: 5,606,992
[45] Date of Patent: Mar. 4, 1997

[54] PULSE WIDTH MODULATED SOLENOID

[75] Inventors: Bradley C. Erickson, Farmington Hills; Garrett R. Holmes, Ortonville, both of Mich.

[73] Assignee: Coltec Industries Inc., New York, N.Y.

[21] Appl. No.: 244,000

[22] Filed: May 18, 1994

[51] Int. Cl.⁶ ............................. F15B 13/044; F16K 31/06
[52] U.S. Cl. ................... 137/596.17; 251/129.14; 251/129.21
[58] Field of Search ............... 137/596.17; 251/129.14, 251/129.21

[56] References Cited

U.S. PATENT DOCUMENTS

| | | | |
|---|---|---|---|
| 3,820,757 | 6/1974 | Siebel | 251/129.21 |
| 4,998,559 | 3/1991 | McAuliffe | 137/596.17 |
| 5,076,323 | 12/1991 | Schudt | 137/596.17 |

Primary Examiner—Gerald A. Michalsky
Attorney, Agent, or Firm—Howard S. Reiter

[57] ABSTRACT

An armature has an inner chamber which becomes effective to delay the otherwise full fluid force against such armature thereby enabling the armature to more readily move closer, in a shorter period of time, to the associated pole piece.

6 Claims, 6 Drawing Sheets

PULSE WIDTH MODULATED SOLENOID

FIELD OF THE INVENTION

This invention relates generally to pulse width modulated solenoid assemblies and more particularly to the modifying of the armature so that such armature can move more quickly and closer to a cooperating pole piece as compared to prior art arrangements.

BACKGROUND OF THE INVENTION

To reduce the cost of the solenoid drive electronics, saturated type drivers are preferred over peak and hold current drivers. However, saturated type drivers significantly increase the power consumed due to their sustained current level. This power consumption results in greater heat generation. A minimum coil resistance (which is much higher than that allowable with a peak and hold driver) is necessary to limit the heat rise. Though a high resistance pulse width modulator (PWM) contains more turns for a given package space, the current rises much more slowly and truncates at a lower level than for a low resistance PMW, resulting in less magnetic force for the same period of time and thereby increasing the time needed to close the armature against the coacting pole piece. This increased time reduces the overall performance of the armature and makes the internal design of the pulse width solenoid more critical. It was the search for an adequate pulse width modulated solenoid design for a saturated type driver which gave rise to the inventive design disclosed herein.

Accordingly, the invention as herein disclosed is primarily directed to the solution of the aforestated as well as other related and attendant problems of the prior art.

SUMMARY OF THE INVENTION

According to the invention, a solenoid assembly comprises electrically energized and de-energized field coil means, pole piece means providing a magnetic flux path whenever said field coil means is energized, valve means movable to and from cooperating valve seat means for at times to be open permitting the flow past the valve means of a relatively high pressure fluid supplied by an associated source, wherein said valve means when moved to engagement with said valve seat means is effective for preventing the flow of said relatively high pressure fluid past said valve means, cylindrical armature means movable toward said pole piece means upon energization of said field coil means and movable to a relatively remote position wherein said armature means is spaced most from said pole piece means upon de-energization of said field coil means, motion transmitting means effective for causing said valve means to become open, wherein said motion transmitting means is operatively situated generally between said armature means and said valve means whereby sufficient axial movement of said armature means toward said pole piece means results in said motion transmitting means to open said valve means, wherein when said field coil means is electrically energized and said armature means responds by moving toward said pole piece means said relatively high pressure fluid tends to resist the movement of said armature means toward said pole piece, and chamber means formed in said armature means for delaying the time at which the full magnitude of said relatively high pressure fluid is fully applied to said armature means thereby enabling said armature means to move toward said pole piece means an initial distance during which said full magnitude of said relatively high pressure fluid is not fully applied to said armature means.

Various objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be eliminated from one or more views.

DETAILED DESCRIPTION OF THE PREFERRED EMBODIMENT

Figure 1:
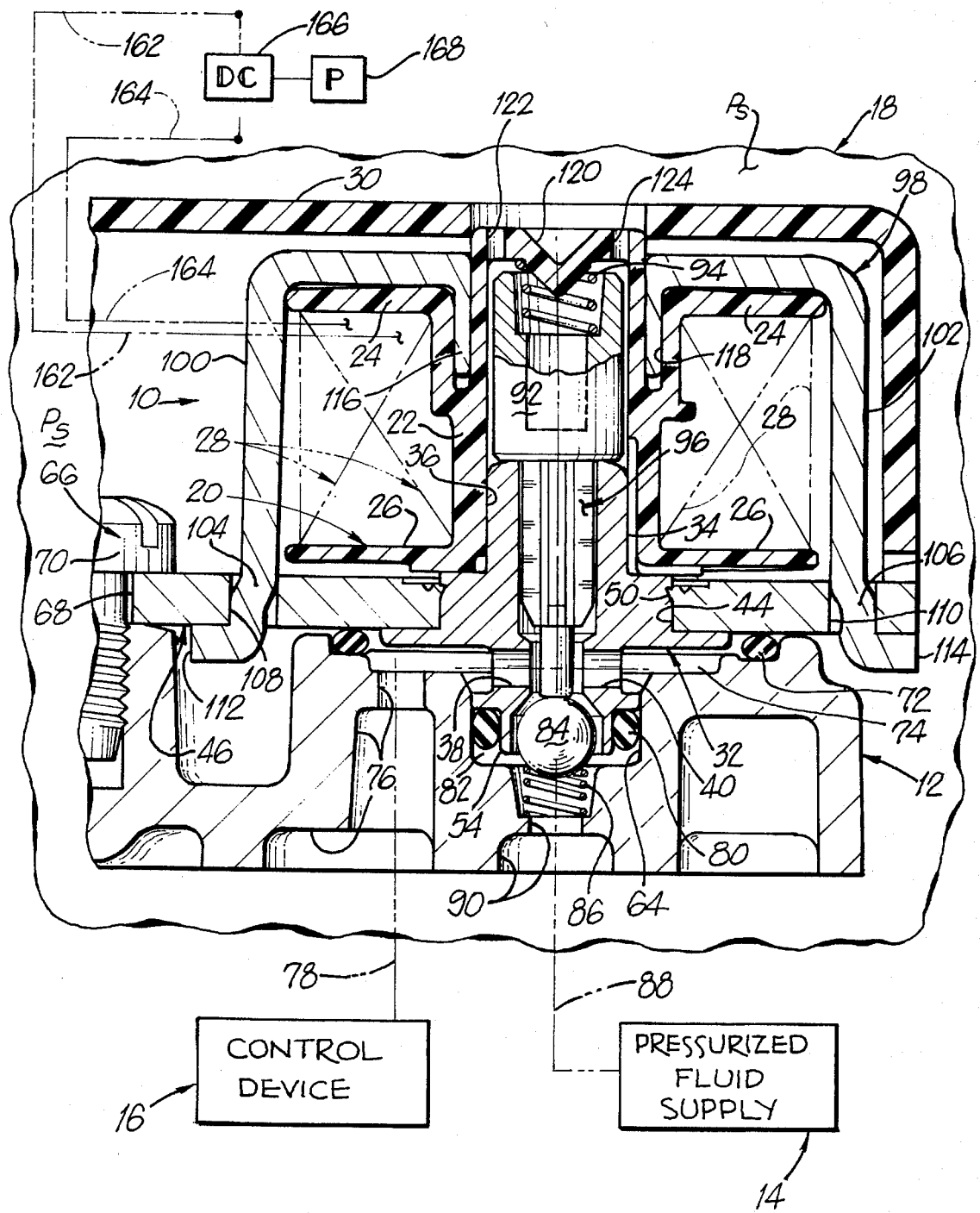
FIG. 1 is a view of a fragmentary portion of structure having a solenoid operated pressure regulating assembly in accordance with the prior art, with all of such being shown, in the main, in cross-section with the plane of such cross-section passing through the central axis of the solenoid winding, armature and valving member (the solenoid assembly being shown in its power-on state)

Referring now in greater detail to the drawings, FIG. 1 illustrates a prior art pulse width modulated solenoid assembly 10 employed in combination with fragmentarily depicted overall structure 12 comprising valving means whereby the pressure of fluid flowing from a supply 14 to a control device is regulated in accordance with and in response to selected parameters and/or indicia of operation of related structure.

The solenoid assembly 10 and the overall structure 12 may, in turn, be encompassed within suitable fragmentarily depicted housing means 18 which, in fact, may comprise a portion of a power transmission assembly as may be employed in the automotive field; i.e., both automobiles and trucks.

Referring still to FIG. 1, the solenoid assembly 10 is shown as comprising a spool assembly 20 which has a generally cylindrical tubular medial portion 22 and integrally formed axially spaced radiating end walls 24 and 26.

A solenoid winding or coil 28 is formed about the tubular medial portion 22 and axially contained as between the opposite annular end wall members 24 and 26.

Spool 20 is preferably comprised of a suitable material having no magnetic properties. It may be that spool 20 is comprised of a plastics material as for example Ultem 2220. "Ultem" is a U.S.A. trademark of General Electric Company of One Plastics Avenue, Pittsfield, Mass., U.S.A., for an amorphous thermoplastic polyetherimide resin. A somewhat outer housing portion 30 extending generally above the solenoid assembly 10, as viewed in FIG. 1, may also be comprised of plastics material, having no magnetic properties such as, for example, Rynite 530. "Rynite" is a U.S.A. trademark, of DuPont de Nemours, E.I. & Co. of Wilmington, Del., U.S.A., for thermoplastic polyester resins.

Rynite resins contain generally uniformly dispersed glass or mica/glass combinations in polyethylene terephthalate formulated for rapid crystallization during the molding process.

Figure 10:
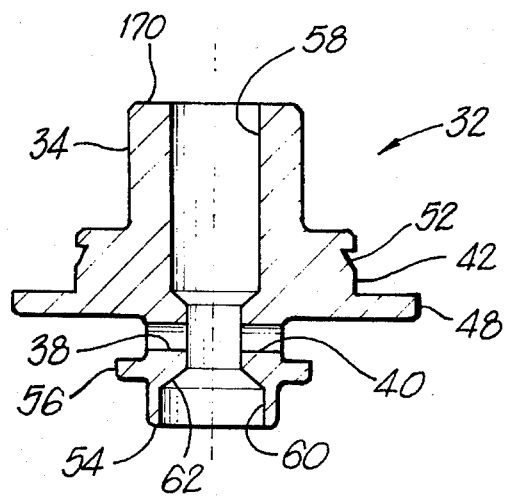
FIG. 10 is an axial cross-sectional view of one of the elements shown in FIG. 1.

Referring to both FIGS. 1 and 10, a pole piece 32 has, preferably, a cylindrical body portion 34 received within a central passage 36 of spool 20. A relatively enlarged cylindrical body portion 42, of pole piece 32, is received in an aperture 44 of a transversely extending metal flux conducting plate 46. A further diametrically enlarged flange 48 serves as an abutment for plate 46 when the plate 46 and pole piece 32 are secured to each other as by a bracker process whereby a portion of the metal of plate 46, in the immediate vicinity of the aperture 44, is cold worked resulting in an annular portion 50 being forced into a coacting annular ring or recess 52 of pole piece body portion 42.

Still referring to both FIGS. 1 and 10, pole piece 32 is shown further comprising an integrally formed axially extending body portion 54 which is preferably provided with a radiating flange portion 56. A centrally located passage 58 is in communication with a relatively shorter centrally situated passage or conduit 60 which is provided with an annular valve seating surface 62. A plurality of passages or conduits 38 and 40 communicate as between passage 58 and chamber means or space external to pole piece 32.

As illustrated in FIG. 1, the body extension 54 of pole piece 32 is received within a recess 64 of structure 12 and secured in such relationship as by screw or fastener means 66 extending through an aperture 68 of plate 46 and operatively engaged with structure 12; i.e., head portion 70 of screw means 66 engages and urges plate 46 downwardly against structure 12. As a consequence, plate 46 sealingly engages an O-ring seal 72 and thereby defines an annular chamber 74 which communicates with conduits 38 and 40 and communicates with passage or conduit means 76 in structure 12 and leading, via conduit means 78, to apparatus or device 16 to be controlled by fluid pressure. A second O-ring seal 80 is sealingly engaged between and by extension 54 of pole piece 32 and the side wall of recess 64 thereby defining a chamber 82. A ball valve 84, received generally by passage 60 (also see FIG. 10) is generally juxtaposed to valve seating and sealing surface 62 and resiliently urged toward a seating condition by resilient means 86. A source or supply 14 of pressurized fluid is placed in communication with chamber 82 as by conduit means 88 and conduit means 90 formed as in structure 12.

A cylindrical armature 92 is slidably received in spool passage 36 and is resiliently biased or urged downwardly (as viewed in FIG. 1) by spring means 94. Such downward movement is normally prevented by push rod 96, ball valve 84 and spring means 86. When the coil means 28 is energized, armature 92 overcomes spring 86 and moves downwardly until it engages the upper end of pole piece 32 thereby moving push rod or valve actuator 96 downwardly, as generally depicted in FIG. 1, and causing ball valve 84 to be moved off and away from its seat 62 thereby completing communication between passages 38 and 40 and chamber 82.

Still referring to FIG. 1, a flux return member 98 is preferably provided. As generally shown, the member 98 is in the form of a generally U-shaped strap having opposite legs 100 and 102 each of which, in turn, is provided as with respective foot portions 104 and 106 extending through slots 108 and 110 in plate 46 and formed-over as at 112 and 114.

The bight portion of U-shaped member 98 is formed as to have an integral downwardly extending open-ended tubular cylindrical portion 116 which is closely received within a co-acting annular recess 118 formed in spool means 20. Consequently, the U-shaped member 98 serves not only as a flux return but also mechanically, both radially and axially, contains spool means 20, armature 92, pole piece 32, push rod 96 and plate 46.

Also, as shown in FIG. 1, the central passage 36 of the spool 20 is effectively closed by an integrally formed transversely extending wall portion 120 which is provided with a plurality of vent passages 122 and 124.

Figure 5:
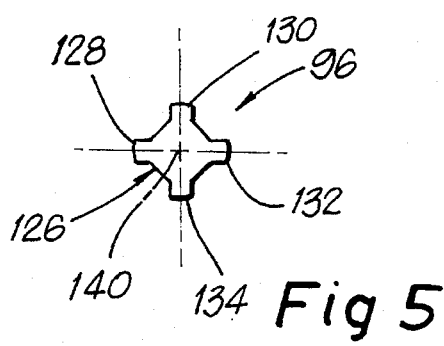
FIG. 5 is a view taken generally on the plane of line 5—5 of FIG. 4 and looking in the direction of the arrows.
Figure 8:
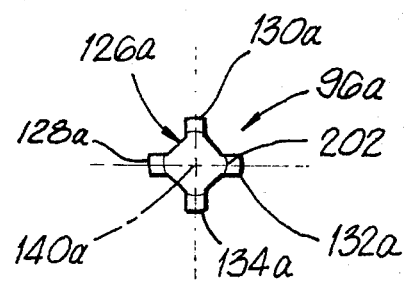
FIG. 8 is a view taken generally on the plane of line 8—8 of FIG. 7 and looking in the direction of the arrows.
Figure 4:
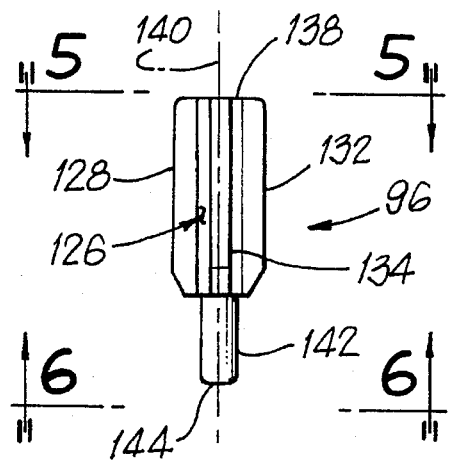
FIG. 4 is a side elevational view of one of the elements shown in FIG. 1.
Figure 7:
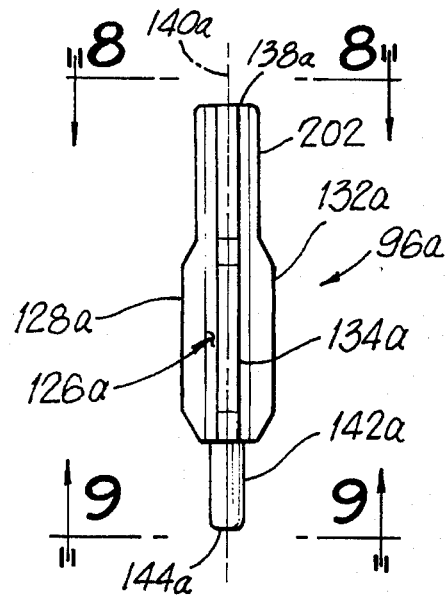
FIG. 7 is a side elevational view of one of the elements shown in each of FIGS. 2 and 3.
Figure 6:
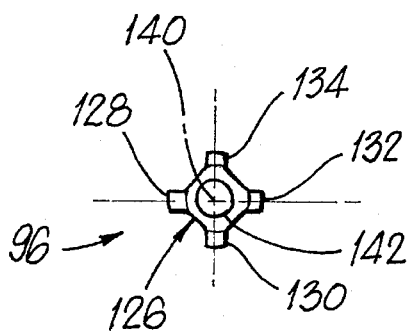
FIG. 6 is a view taken generally on the plane of line 6—6 of FIG. 4 and looking in the direction of the arrows.
Figure 9:
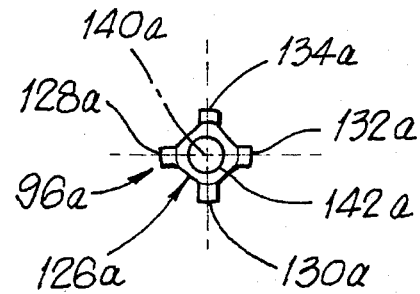
FIG. 9 is a view taken generally on the plane of line 9—9 of FIG. 7 and looking in the direction of the arrows.

Referring to FIGS. 4, 5 and 6, the push rod 96 is shown as comprising an axially extending main body 126 with integrally formed rib-like or guide portions 128, 130, 132 and 134 extending axially and radiating outwardly. The upper end 138 of push rod 96 is preferably flat and normal to the axis 140 of push rod 96 and the radially outer surfaces of rib portions 128, 130, 132 and 134 are generally parallel to axis 140. The main body 126 has an integrally formed axially extending portion 142 which, at its axial end 144 and as shown in FIG. 1, effectively engages the ball valve 84.

As shown in FIGS. 1, 4 and 10, the push rod 96 is slidably received in passage 58 (FIG. 10) of pole piece 32 and when depressed further into passage 58 as in FIG. 1 moves ball valve 84, against the resilient resistance of spring 86, to an opened position with respect to valve seating surface 62 (FIG. 10).

Figure 11:
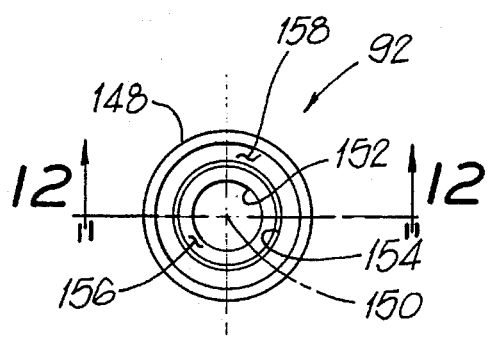
FIG. 11 is a top or end view of another of the elements shown in FIG. 1.
Figure 14:
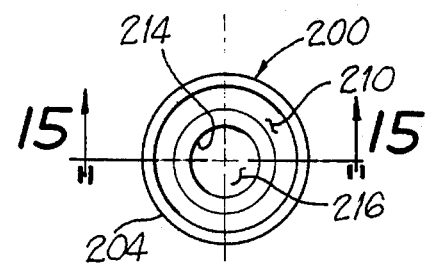
FIG. 14 is a top or end view of another of the elements shown in each of FIGS. 2 and 3.
Figure 12:
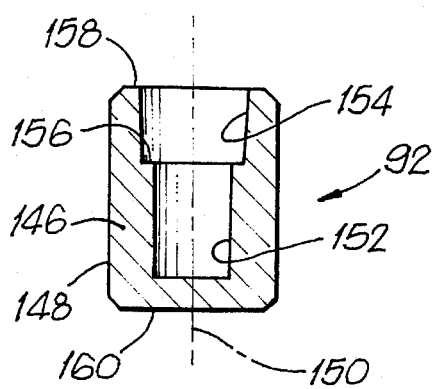
FIG. 12 is an axial cross-sectional view taken generally on the plane of line 12—12 of FIG. 11 and looking in the direction of the arrows.
Figure 15:
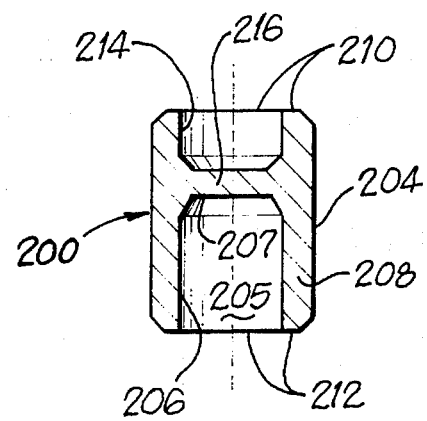
FIG. 15 is an axial cross-sectional view taken generally on the plane of line 15—15 of FIG. 14 and looking in the direction of the arrows.

Referring primarily to FIGS. 1, 11 and 12, the armature 92 is illustrated as comprising a member or body 146 which has an outer cylindrical surface 148 the axis of which is at 150. The body 146 is provided with a first closed end axially extending recess or chamber 152 and a second axially extending recess or passage 154 which is of a diameter greater than that of recess 152 thereby providing an annular shoulder 156 against which the spring 94 (FIG. 1) can react. The spaced axial end surfaces 158 and 160 may be considered respectively flat, parallel to each other and normal to axis 150.

External devices operatively connected to the valve assembly 10, described above, are indicated schematically in FIG. 1. Electrical conductors and/or leads 162 and 164, comprising or operatively connected to the respective ends of coil or winding 28, are operatively connected to a direct current power source, indicated at 166, which energizes coil 28 in cyclic pulses under the control of an electronic processor, P, at 168. Processor 168 is supplied with appropriate inputs, depending upon the particular application, to vary the "on" time of the solenoid during each cycle. The "on" time, of course, is that time during which the winding or coil 28 is electrically energized. In an automatic transmission control application, for example, inputs to the processor might include engine speed, vehicle speed, throttle position, etc. The pulsation frequency is a fixed frequency, typically 50 Hz (cycles/sec) and the processor 168 will control the length or percentage of time during each cycle during which the solenoid coil is energized.

As depicted in FIG. 1, the processor 168 is causing the source of direct current 166 to electrically energize the winding or coil 28. Such energization of coil 28, in turn, has caused the armature 92 to have moved downwardly (as viewed in FIG. 1) resulting in armature end surface 160 engaging the axial end surface 170 of pole piece 32.

As a consequence, armature 92 has moved plunger or push rod 96 downwardly causing end 144 of push rod 96 to unseat ball valve 84 by pushing it away from its cooperating valve seat 62 (FIGS. 10 and 1) and against the resistance of spring 86.

For purposes of discussion, let it be assumed that the pressurized fluid supply 14 maintains a supply pressure of 60.0 psig. and that when ball valve 84 is sealingly closed against its valve seat 62, the magnitude of the control pressure, as within control device 16 and downstream of valve seat 62, is 0.0 psig.

In the operating condition depicted in FIG. 1, ball valve 84 has been opened by push rod 96 which has been moved downwardly by the field actuated armature 92. Such occurs against the resilient resistance of spring means 86. With valve 84 being thusly moved away from valve seat 62, the pressurized fluid from supply 14 flows as through conduit means 88 and 90 into chamber 82 from where it flows (also see FIG. 10) between valve 84 and cylindrical surface 60 and between valve 84 and seat 62 into passage 58 and, through passages 38 and 40, into chamber 74. From chamber 74, the fluid flows to control device 16, as via passage or conduit means 76 and 78, thereby supplying high pressure fluid, from source 14, to device 16. As shown in FIGS. 5 and 6, the push rod 96 is fluted thereby providing for fluid flow axially through passage 58 as between push rod portions 128, 130 portions 130, 132 portions 132, 134 and portions 134, 128. It may be assumed that when armature 92 is seated against the end 170 of pole piece 32, as depicted in FIG. 1, that upward flow (as viewed in FIG. 1) of fluid out of passage 58 is terminated by armature 92.

Armature 92 is slidably received in passage 36 and the clearance between armature 92 and passage 36 is such as to permit what may be considered leakage flow therethrough and out of passages or vents 122 and 124 to sump pressure, $P_s$, which may be assumed to be 0.0 psig.

When the processor (P) 168 turns the current power source 166 "off" the magnetic field of coil means 28 ceases to exist and spring 86 moves ball valve 84 upwardly, as viewed in FIG. 1, and simultaneously moves push rod 96 upwardly resulting in armature 92 also being moved upwardly by the action of intermediate push rod 96. Such upward movement of ball valve 84, push rod 96 and armature 92 continues until ball valve 84 abuts and engages valve seat portion 62.

When the just-described elements are thusly stopped, the upper end 158 (FIGS. 1 and 12) of armature 92 is brought into at least closely spaced relationship with respect to the upper closed end 120 of passage 36. It should be clear that when the armature 92 is thusly brought into a closely spaced relationship with upper closed end 120, that the preload force on spring 94 is less than the preload force of spring 86 holding ball 84, plunger 96 and armature 92 in said upward position.

It should be clear that at this time, wherein the identified elements have been moved upwardly by spring 86, that any fluid in passage 58 and any fluid as between armature 92 and passage 58 will be at 0.0 psig.

With the solenoid winding 28 being energized in cyclic pulses of a time duration determined by the processor (P) 168 and de-energized between successive pulses, the pressure supplied to the control device 16 will be a percentage of the pressure differential between the supply source 14 and sump $P_s$, which is equal to the percentage of time that solenoid coil 28 is de-energized. For example, if it is assumed that fluid source 14 supplies fluid at 60.0 psig. and the pressure existing at control device 16 is 0.0 psig., as is the pressure of $P_s$, if winding 28 is de-energized 50% of the time, the pressure supplied to the control device 16 will be in the order of 30.0 psig.

Considering now the situation wherein the coil or winding 28 is in its de-energized state and wherein spring 86 has upwardly moved ball valve 84, push rod or plunger 96 and armature 92. The distance that push rod or motion transmitting means 96 has been moved upwardly is equal to the distance that ball valve 84 has moved, as from the position depicted in FIG. 1, to its sealing position against valve seat 62 (also see FIG. 10). Consequently, armature 92, and in particular the axial end surface 160 of armature 92, is also moved upwardly away from axial end surface 170 of pole piece 32 the same distance as which ball valve 84 moved to its engagement with valve seating surface 62.

With the coil or winding 28 being de-energized, as set forth above, let the series of events, as occur upon the winding 28 becoming energized, be considered. At the instant that coil 28 is started to be energized, axial end surface 160 (FIG. 12) of armature 92 is spaced from the juxtaposed axial end surface 170 (FIG. 10) of pole piece 32.

The magnetic flux of energized coil 28 starts the armature 92 to move downwardly toward the then spaced end 170 of pole piece 32. In starting such movement, push rod 96 is also started in its downward movement and such initiation of downward movement by push rod 96 unseats ball valve 84 enabling the relatively high pressure fluid of supply 14 to flow past open (or opening) valve 84 and through the axial spaces of fluted push rod 96. Such relatively high pressure fluid fills the space axially between armature end surface 160 and end surface 170 of pole piece 32. The existence of such relatively high pressure fluid in the space between juxtaposed transverse surfaces 160 and 170, very quickly presents a relatively high pressure, and consequent force, against the end surface 160 of armature 92 resisting the movement of the armature 92 toward pole piece 32. As is evident, this resisting hydraulic pressure results in what may be considered an increased time for the armature 92 to move from its non-actuated state to its fully actuated state and, therefore, the overall performance of the armature 92 is reduced and makes the internal design of the pulse width solenoid more critical.

Figure 2:
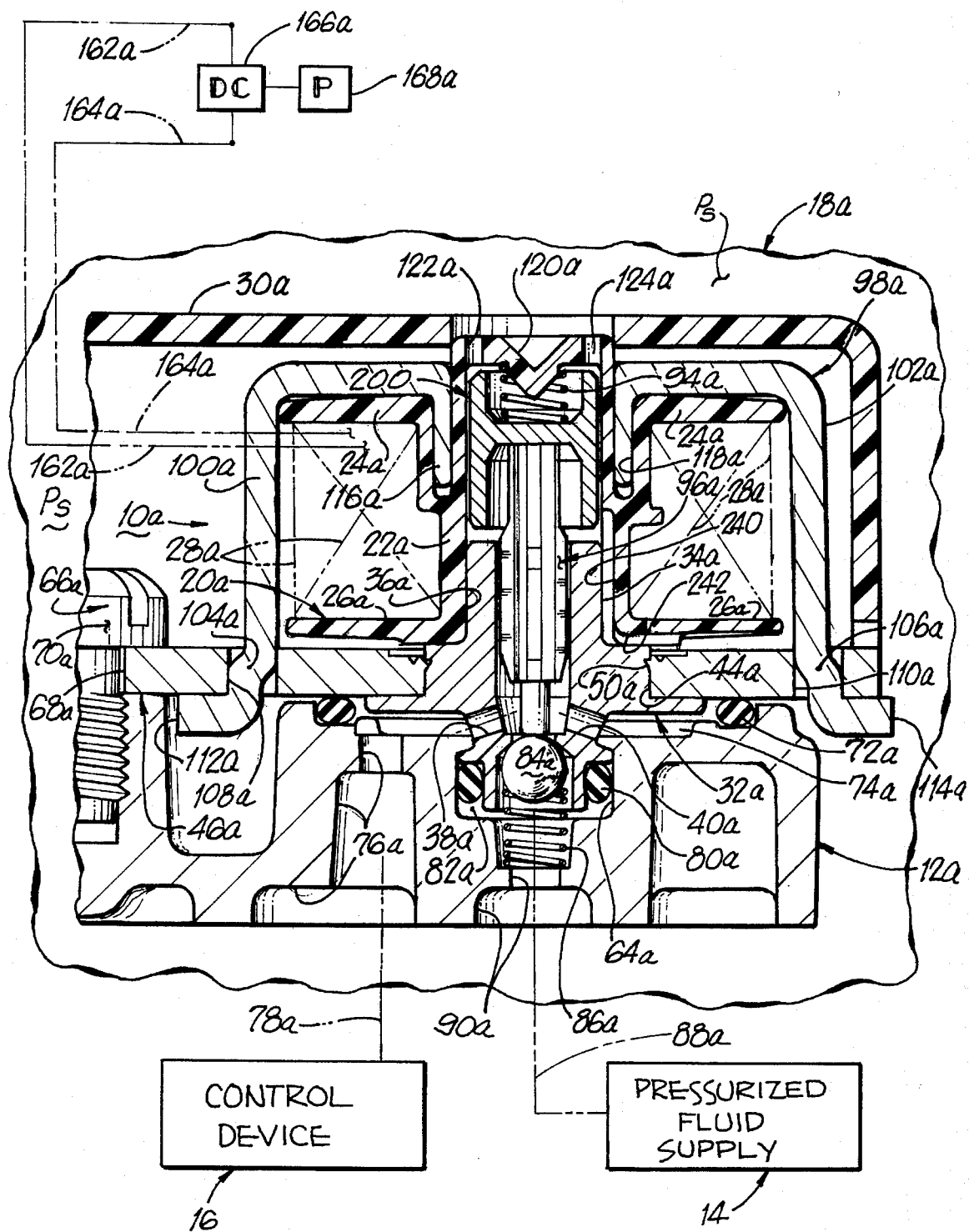
FIG. 2 is a view taken similarly to that of FIG. 1 but of apparatus employing teachings of the invention with such apparatus being depicted in its power-off state.
Figure 3:
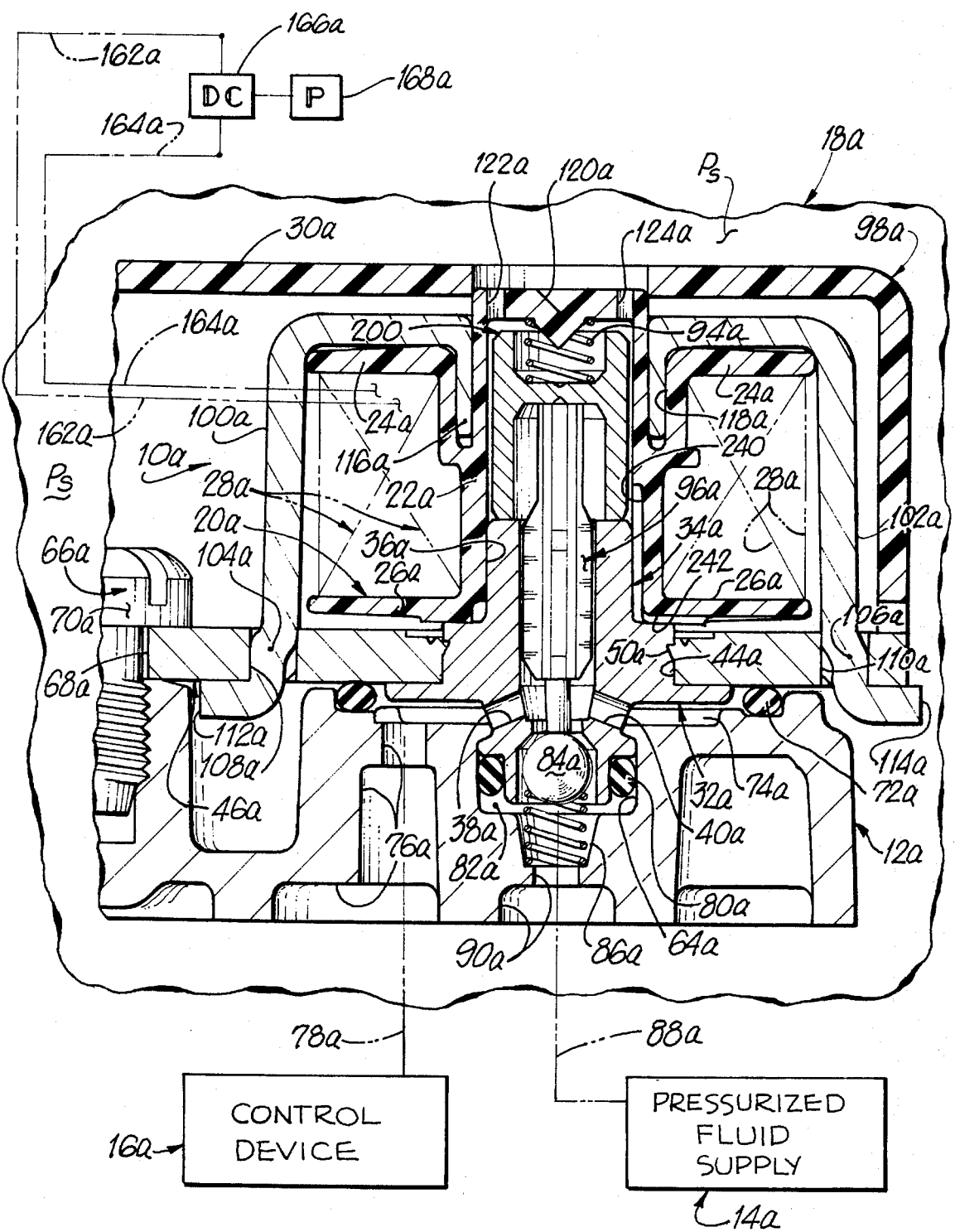
FIG. 3 is a view taken as that of FIG. 2 but illustrating the apparatus of FIG. 2 in its power-on state.

FIGS. 2 and 3 illustrate a solenoid operated valving assembly employing teachings of the invention. Except as otherwise noted, all elements in FIGS. 2 and 3 which are like or similar to those of FIG. 1 are identified with like reference numbers provided with a suffix "a".

In FIGS. 2 and 3 the invention is shown employing an armature means 200 conceptually different from the armature means 92 of FIG. 1. The push rod or motion transmitting member 96a of FIGS. 2 and 3, though similar to push rod 96 of FIG. 1, comprises certain differences.

Referring to FIGS. 2, 3, 7, 8 and 9, it can be seen that the axial length of push rod or motion transmitting means 96a is significantly greater than that of push rod 96. The upper portion 202 of motion transmitting means 96a is preferably of a comparatively reduced cross-sectional configuration and area.

Figure 13:
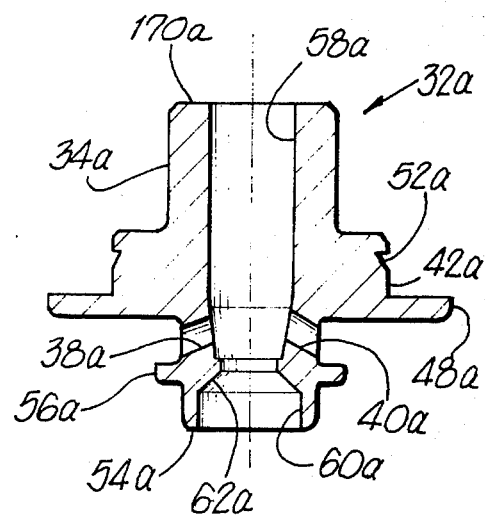
FIG. 13 is an axial cross-sectional view of one of the elements shown in each of FIGS. 2 and 3.

The pole piece 32a of FIGS. 2, 3 and 13 is shown joined to the transverse flux plate 46a as in the manner described with reference to FIG. 1.

Armature 200 (FIGS. 2, 3, 14 and 15) comprises a cylindrical wall 208, of generally uniform cross-sectional thickness and outer cylindrical surface 204, axially extending from and to opposite axial ends 210 and 212. A first axially extending recess or chamber 205 having, preferably, an inner cylindrical surface 206, is formed into armature 200, through end 212, as to be, preferably, concentric to outer surface 204. A second axially extending recess or chamber 214 is formed into armature 200 through opposite end 210 as to be, preferably, concentric to outer surface 204 and chamber or recess 206. In the preferred embodiment, armature 200 comprises a transverse wall 216 effectively separating chamber 214 from chamber 205.

As already generally indicated in the description heretofore made of the apparatus of FIG. 1, when ball valve 84 (FIG. 1) or 84a (FIGS. 2 and 3) is seated as against its cooperating valve seat, the relatively high pressure fluid is maintained upstream of closed ball valve 84a (FIG. 2).

Continuing the description primarily in relation to the apparatus of FIGS. 2 and/or 3, when ball valve 84a is closed to fluid flow therepast, the relatively high pressure fluid from source or supply 14 is kept in conduit means 88a, conduit means 90a and chamber space 82a, all upstream of ball valve 84a.

At this time, apparatus 10a being electrically de-energized, the low or sump pressure or control pressure, $P_s$, which may be 0.0 psig., exists in conduit means 78a, conduit 76a leading to chamber 74a from where flow radially outwardly is prevented by sealing O-ring 72a and from where (74a) flow downwardly into chamber 82a is prevented by O-ring 80a and the relatively high pressure fluid already in chamber 82a.

The low pressure fluid, $P_s$, in chamber 74a flows through radial passages 38a and 40a and continues upwardly through passage 58a and more specifically through the longitudinally extending spaces existing between adjoining radially extending arms 128a, 130a, 132a and 134a.

Vents 122a and 124a communicate as between the sump pressure $P_s$ and the interior of the passage 36a containing pole piece 32a and armature means 200. Consequently, the low sump or low control pressure $P_s$ exists as between the outer surface 204 and the juxtaposed inner cylindrical surface 36a of bobbin 20a. The same low pressure $P_s$ exists in armature chamber 214 and between end 210 of armature 200 and transverse end wall 120a of bobbin 20a. Further, the same low pressure, $P_s$, fluid is brought into chamber 205 and between spaced juxtaposed ends 212 (of armature 200) and 170a (of pole piece 32a).

Still further, the generally centrally disposed tubular portion 22a of bobbin 20a is provided with a plurality of generally axially extending slots or grooves, one of which is depicted at 240, which, in turn, communicate with relieved portions, one of which is depicted at 242 in lower shown end wall 26a of bobbin 20a. Consequently, the fluid under the relatively low, control or sump pressure, $P_s$, flows through such passages, slots or grooves effectively encompassing the bobbin 20a, electrical field coil 28a and armature means 200.

When ball valve 84a is in an open condition, as depicted in FIG. 3, the relatively high pressure fluid, which was held upstream of the closed ball valve 84a (FIG. 2), now flows from chamber 82a past valve 84a and into passage means 58a of pole piece 32a. The high pressure fluid also flows through passage or conduit means 38a and 40a into chamber 74a from where conduit means 76a and 78a communicate with high pressure fluid to the control device or apparatus 16a. The high pressure fluid flows through the longitudinal spaces provided by motion transmitting means 96a and into the space as previously existed between armature end 212 and pole piece end 170a as generally depicted in FIG. 2. However, when armature 200 becomes seated as against end face 210 of pole piece 32a, the fluid pressure; (a) between armature 200 and passage 36a; (b) the fluid in the longitudinal grooves or recesses typified at 240; (c) the fluid in and through passages or openings 242 and (d) the fluid generally surrounding the spool 20a and coil or winding 28a becomes and stays at the relatively low pressure, $P_s$. Of course, when in the position depicted in FIG. 3 chamber 205 of armature 200 effectively contains a part of the upper portion of motion transmitting means 96a and the relatively high pressure fluid, $P_h$, supplied through the longitudinal spaces of member 96a.

When processor 168a produces the next signal, electrical source 166a terminates, via conductors 162a and 164a, energization of coil or winding means 28a. Consequently, spring 86a resiliently moves ball valve 84a upwardly until it engages and sealingly seats against cooperating valve seat 62a preventing fluid flow past closed valve 84a. The movement of ball valve 84a causes like upward movement of push rod or motion transmitting means 96a resulting, in turn, of armature 200 being moved by the push rod 96a in a direction away from pole piece 32a and toward the transverse wall portion 120a which has vent passages 122a and 124a. At this time when the elements assume their respective positions depicted in FIG. 2, all the fluid pressures downstream of closed ball valve 84a, as previously described, are at the 0.0 psig., or $P_s$, magnitude and such low fluid pressure, of course, exists in chamber 205 of armature 200.

Figure 16:
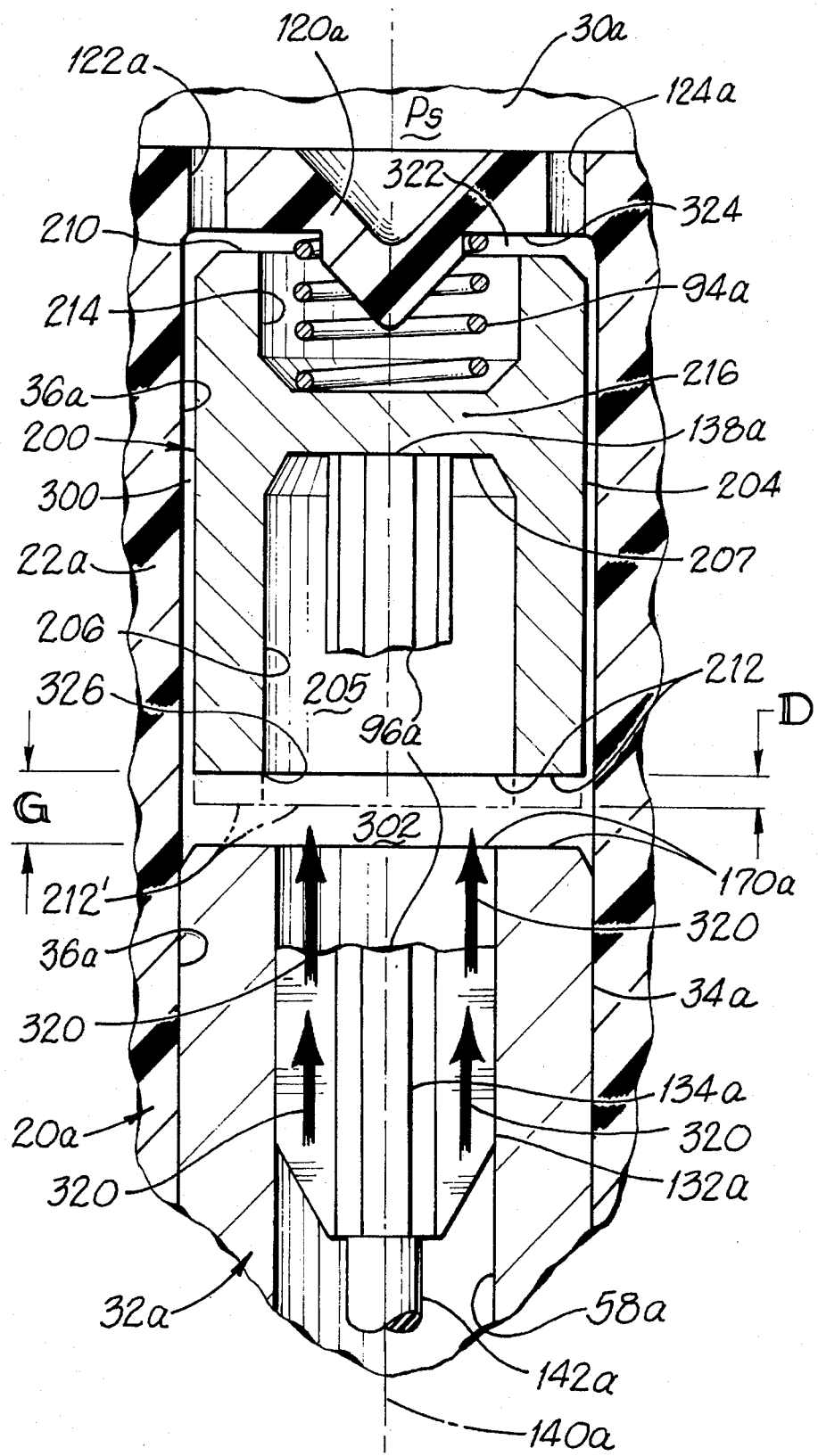
FIG. 16 is an enlarged fragmentary portion of FIG. 2 depicting the movement of the armature toward its pole piece.

FIG. 16 an enlarged fragmentary portion of the structure of FIG. 2, more clearly depicts the relative positions of armature 200, spring 94a, motion transmitting member 96a, pole piece 32a and portion 22a of spool 20a. In FIG. 16, generally corresponding to FIG. 2, the field coil 28a was de-energized thereby enabling spring 86a to move ball valve 84a upwardly (as viewed in FIG. 2) until such ball valve 84a operatively engaged valve seating surface 62a. While so being moved by the spring 86a, ball valve 84a being in abutment with push rod or motion transmitting means 96a causes the armature 200 to be moved, against biasing spring 94a, to the position as depicted in FIG. 16. This can then be assumed that: (a) at this condition armature 200 is at its greatest distance away from pole piece 32a; (b) that end face 12 of armature 200 and end face 170a of pole piece 32a have a working gap of a distance, G; and (c) that the generally tubular-like space 300 existing generally between outer surface 204, of armature 200, and the inner surface 36a of the spool 20a is filled with low pressure fluid at, for example, $P_s$, and that such further communicates as with ambient via passages or vents 122a and 124a leading to an area of ambient. At this time, the chamber or recess 205 is also filled with the low pressure fluid, $P_s$, as is the space between armature 200 and pole piece 32a; for ease of reference such space being identified as 302. Also, because ball valve 84a (see FIG. 2) has terminated the flow of the relatively high pressure fluid, $P_h$, all the available space within passage 58a is filled with the low pressure fluid, $P_s$.

When next the processor 168a causes the source 166a of electrical potential to again energize the field coil or winding 28a, the armature 200 is started to be moved downwardly towards pole piece 32a. In the preferred embodiment, the instant that armature 200 starts to move downwardly (as viewed in any of FIGS. 2, 3, or 16) the motion transmitting means or push rod 96a also starts moving downwardly. Further, in the preferred embodiment, the instant that push rod 96a starts to move downwardly, the ball valve 84a (see FIG. 2) starts to move downwardly thereby starting to open the passage 62a (FIG. 13) to the flow of the relatively high pressure fluid, $P_h$, as supplied from source 14.

In FIG. 16, the heavy drawn arrows 320—320 are intended to represent the inflow, via 58a, of the said high pressure fluid, $P_h$.

Referring now to the prior art of FIGS. 1, 4, 5, 6, 10, 11 and 12, when the coil 28 is energized, the ball valve 84 is unseated, and the fluid or hydraulic pressure at $P_h$ is quickly communicated or effectively immediately applied to the bottom closed face or surface 160 at the bottom end of the armature 92. This relatively high fluid pressure, $P_h$, applied to end surface 160 of armature 92 opposes movement of armature 92 in the downward direction, increasing the time it takes for the armature 92 to contact the pole piece 32, thereby increasing the time it takes for control pressure to be sealed from the ambient atmosphere. When the field coil 28 is de-energized, the armature 92 drop out time is also long due to the small hydraulic area acting against the armature 92; such area being, in effect, the projected cross-sectional area of passage 58 (of pole piece 32). The long pull-in and drop-out times of the prior art reduce the useable duty cycle range of the prior art pulse width modulated solenoid assembly and the difference between the pull-in and drop out times reduces the pressure ratio at a given duty cycle.

Referring to FIGS. 2, 3, 7, 8, 9, 13, 14, 15 and 16, depicting the preferred embodiment of the invention, comprises, in effect, an empty volume or chamber 205 in the armature 200 which, by a slight or small delay, must become filled with the fluid, supplied by 14, before a substantial increase in hydraulic pressure can occur. Such small delay in hydraulic pressure rise allows greater initial movement of armature 200 toward pole piece 32a before the full pressure force of the fluid at $P_h$ is fully applied to the armature 200 in the direction resisting movement of armature 200 toward pole piece 32a.

In FIG. 16, the armature 200 is shown at its uppermost position because the coil or winding 28a is de-energized. At that condition the armature working gap (i.e., the distance between armature face 212 and pole piece face 170a) is assumed and depicted to be a distance or gap G. Further, in this de-energized condition, any fluid which may be in the: (a) available space 58a; (b) space 302; (c) cylindrical-like space 300; (d) space in recess or chamber 214; (e) space 322 axially between end 210 of armature 200 and surface 324 of spaced juxtaposed end wall 120a; (f) vent passages 122a and 124a to ambient as at 30a; and (g) chamber 205 in armature 200, will, at most, be at the pressure $P_s$.

When next coil or winding 28a is energized, before the fluid at relatively high pressure, $P_h$, can fully apply itself as against the armature, the armature 200 relatively quickly moves as by a depicted assumed distance, D, toward the pole piece 32a. This ability of armature 200 to relatively quickly move from its solid line position (in FIG. 16) to the phantom line position (also in FIG. 16), as previously indicated, is made possible because of the additional time that it takes for the high pressure, $P_h$, fluid to fill chamber 205 of armature 200. By the time such is achieved, the armature 200 will have already, rather quickly, moved to the phantom line position at 212'. It must be remembered that when armature 200 does reach position, D, such is not a point at which armature 200 stops moving (or pauses), rather, it is only a depiction of to where the armature 200 may be considered as having been moved by the time that fluid at a high pressure, $P_h$, fully applies itself against the armature 200.

The armature 200 with the full force of the high pressure ($P_h$) fluid resisting, continues to move, from phantom line position 212', toward end 170a of pole piece 32a.

As should now be evident, armature 200 has moved to the phantom line position 212' in a significantly quicker time then would have armature 92 moved such distance because the prior art armature 92 would immediately experience the full force of the high pressure, $P_h$, fluid applied against end face or surface 160 while armature 200, primarily because of the volume 205 results in a delay before the high fluid pressure, $P_h$, force can be fully applied to the armature 200.

Consequently, armature 200 is first to attain position 212' and in so doing brings about a further important benefit. What armature 200 has done by being first to attain a position 212' is to more quickly reduce the working air gap between armature end surface 212' and end surface 170a of pole piece 32a. In so doing the working air gap by being thusly quickly reduced brings about the amplifying of the magnetic force gain thereby further accelerating the armature 200 toward pole piece 32a.

This faster reacting armature 200 more quickly contacts the pole piece 32a and therefore more quickly seals the control pressure from atmosphere, thus decreasing the pull-in time. The drop out time of the armature 200 is also reduced due to the increased hydraulic area acting against the armature 200. This can be seen in either FIGS. 3 or 16 where upon armature 200 operatively contacting pole piece 32a, the flow of the relatively high pressure fluid, $P_h$, flowing or communicating through the available flow space in passage 58a (of the pole piece 32a) is in direct communication with chamber 205 of armature 200. The transverse cross-sectional area of chamber 205 against which such relatively high pressure, $P_h$, fluid is applied, is much greater than the area of the prior art armature 92 against which the relatively high pressure, $P_h$, fluid is applied. In FIG. 1, the relatively high pressure, $P_h$, fluid is applied to the transverse cross-sectional area defined by passage 58. Further, there is nothing in the prior art which causes a delay in the build-up or full application of the relatively high pressure, $P_h$, fluid from source 14.

In the preferred embodiment of the invention, chamber 205 is made to be right cylindrical even though the essence could be said to reside in the space provided by chamber 205. It is contemplated that the axially upper portion cylindrical wall 206 and chamber 205 may actually be laterally enlarged from that as shown in FIG. 16.

Further in the preferred embodiment of the invention, the opening or inlet 326 to space 205 of armature 200 is arranged as to be generally in line with the direction of flow of the relatively high pressure, $P_h$, fluid as depicted by arrows 320—320. Best results are obtainable when chamber 205 and entrance opening 326 are situated as to be at least mostly in registry or alignment with the direction of the flow of relatively high pressure, $P_h$, fluid.

Although only a preferred embodiment and certain modifications of the invention have been disclosed and described, it is apparent that other embodiments and modifications are possible within the scope of the appended claims.

What is claimed:

1. A solenoid assembly for controlling the flow of a relatively high pressure fluid from a source of said high pressure fluid and to apparatus to be acted upon by said high pressure fluid, said solenoid assembly comprising an electrically energizable and electrically de-energizable field coil means, when electrically energized said field coil means being effective for creating a magnetic field, a spool carrying said field coil means, said spool comprising a generally centrally situated first passage-like portion, wherein said field coil means is wound generally about said first passage-like portion externally thereof, a pole piece situated generally at one end of said first passage-like portion, an armature generally slidably received by said first passage-like portion, wherein said armature comprises a generally tubular axially extending main body defining a generally centrally formed axially extending second passage-like portion, wherein said armature further comprises a wall portion carried by said main body as to be transverse to said axially extending second passage-like portion and joined to said generally tubular axially extending main body, wherein said wall portion serves to define an axial end wall of said second passage-like portion, wherein said axial end wall and said second passage-like portion conjointly define a chamber, wherein said armature comprises axially spaced first and second axially opposite armature ends, wherein when said field coil means is electrically de-energized said armature is so positioned as to have said first axial armature end axially spaced a predetermined distance away from an end of said pole piece, a valve member for opening and closing the flow of said relatively high pressure fluid from said source, a conduit defined by said pole piece and leading generally from said valve member and to the axial space between said first axial armature end and said end of said pole piece, wherein when said field coil means is electrically energized said valve member is caused to become open enabling said relatively high pressure fluid to flow from said source and through said conduit toward said armature first axial end, wherein when said field coil means is electrically energized said armature is acted upon by said magnetic field and thereby caused to move axially toward said end of said pole piece, an opening to said chamber formed in said armature first axial end, and wherein said relatively high pressure fluid flowing toward said armature first axial end first flows into said chamber while said armature is moving toward said end of said pole piece, wherein said defined axial end wall prevents fluid flow therethrough from said chamber, and wherein the full force of said relatively high pressure fluid becomes applied to said armature to resist movement of said armature toward said end of said pole piece upon said chamber becoming filled with said relatively high pressure fluid.

2. A solenoid assembly according to claim 1 and further comprising motion transmitting means effectively engaged by said armature and movable by said armature against said valve member for at times causing said valve member to move away from a cooperating valve seat to thereby become open for the flow therethrough of said relatively high pressure fluid from said source.

3. A solenoid assembly according to claim 2 wherein said motion transmitting means is slidably received by said conduit.

4. A solenoid assembly according to claim 2 wherein a portion of said motion transmitting means is received within said chamber and in operative abutting relationship to a surface of said armature comprising said chamber.

5. A solenoid assembly according to claim 2 wherein a portion of said motion transmitting means is received by said chamber of said armature, wherein said armature said valve member and said motion transmitting means are in linear solid relationship, wherein first resilient means operatively resiliently urges said armature and said motion transmitting member toward said valve member, and wherein second resilient means urges said valve member toward said motion transmitting member and said armature, and wherein the preload force of said second resilient means is greater than the preload force of said first resilient means.

6. A solenoid assembly comprising electrically energized and de-energized field coil means, pole piece means providing a magnetic flux path whenever said field coil means is energized, valve means movable to and from cooperating valve seat means for at times to be open permitting the flow past the valve means of a relatively high pressure fluid supplied by an associated source, wherein said valve means when moved to engagement with said valve seat means is effective for preventing the flow of said relatively high pressure fluid past said valve means, cylindrical armature means movable toward said pole piece means upon energization of said field coil means and movable to a relatively remote position wherein said armature means is spaced most from said pole piece means upon de-energization of said field coil means, motion transmitting means effective for causing said valve means to become open, wherein said motion transmitting means is operatively situated between said armature means and said valve means whereby sufficient axial movement of said armature means toward said pole piece means results in said motion transmitting means opening said valve means, wherein when said field coil means is electrically energized and said armature means responds by moving toward said pole piece means said relatively high pressure fluid tends to resist the movement of said armature means toward said pole piece, and chamber means formed in said armature means as to have a first axial end continually closed to the flow of said fluid therethrough and as to have a second axial end continually open to the flow of said fluid into and out of said chamber means, said chamber means being effective for delaying the time at which the full magnitude of said relatively high pressure fluid is fully applied to said armature means thereby enabling said armature means to move toward said pole piece means an initial distance during which said full magnitude of said relatively high pressure fluid is not fully applied to said armature means.

* * * * *